US012632312B2

(12) United States Patent
Aronovich et al.

(10) Patent No.: US 12,632,312 B2
(45) Date of Patent: May 19, 2026

(54) AUTOMATIC RESOURCE QUOTA CALCULATIONS BASED ON TENANT WORKLOADS

(71) Applicant: International Business Machines Corporation, Armonk, NY (US)

(72) Inventors: Lior Aronovich, Thornhill (CA); Kevin Doyle, Whitby (CA)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 17/643,258

(22) Filed: Dec. 8, 2021

(65) Prior Publication Data

US 2023/0176918 A1 Jun. 8, 2023

(51) Int. Cl.
*G06F 9/50* (2006.01)
*G06N 20/00* (2019.01)

(52) U.S. Cl.
CPC ............ *G06F 9/505* (2013.01); *G06F 9/5038* (2013.01); *G06N 20/00* (2019.01)

(58) Field of Classification Search
CPC ...... G06F 9/505; G06F 9/5038; G06F 9/4881; G06F 2209/5019; G06F 2209/508; G06N 20/00; G06N 5/01
See application file for complete search history.

(56) References Cited

U.S. PATENT DOCUMENTS

| | | | |
|---|---|---|---|
| 8,719,831 B2 | 5/2014 | Radmilac | |
| 8,978,035 B2 | 3/2015 | Mcgrath | |
| 9,569,277 B1 * | 2/2017 | Cropper | ............... G06F 9/5011 |
| 9,602,426 B2 | 3/2017 | Das | |

(Continued)

FOREIGN PATENT DOCUMENTS

| | | |
|---|---|---|
| CN | 102426542 B | 6/2013 |
| CN | 111279315 A | 6/2020 |

(Continued)

OTHER PUBLICATIONS

Herbst, Self-Adaptive Workload Classification and Forecasting for Proactive Resource Provisioning (Year: 2013).*

(Continued)

*Primary Examiner* — Aimee Li

*Assistant Examiner* — Andrew Sun

(74) *Attorney, Agent, or Firm* — Michael A. Petrocelli

(57) ABSTRACT

A method, computer program product and computer system to calculate resource quotas in a distributed computing environment are provided. A processor retrieves workload data regarding a plurality of workloads in a shared computing environment, where the plurality of workloads are executing or pending execution within the shared computing environment. A processor identifies a plurality of tenants of the shared computing environment associated with the plurality of workloads. A processor determines an expected resource usage for the plurality of tenants. A processor determines a ratio of resource usage for the plurality of tenants. A processor determines a resource limit for the plurality of tenants. A processor adjusts at least one aspect of the shared computing environment based on a determination that a total expected resource usage for both executing and pending workloads of a tenant exceeds a resource limit associated with the tenant.

17 Claims, 6 Drawing Sheets

(56)                References Cited

U.S. PATENT DOCUMENTS

| | | | | |
|---|---|---|---|---|
| 10,193,977 | B2 | 1/2019 | Ke | |
| 10,333,863 | B2 | 6/2019 | Klots | |
| 10,601,672 | B2 | 3/2020 | Jeuk | |
| 11,212,236 | B2 | 12/2021 | Sundaram | |
| 12,204,950 | B2 * | 1/2025 | Watson-Jones | G06F 9/505 |
| 2013/0185433 | A1 * | 7/2013 | Zhu | G06F 9/5011 |
| | | | | 709/226 |
| 2014/0359113 | A1 | 12/2014 | Krebs | |
| 2017/0180254 | A1 | 6/2017 | Certain | |
| 2019/0132257 | A1 * | 5/2019 | Zhao | G06F 9/5044 |
| 2019/0205173 | A1 * | 7/2019 | Gupta | G06F 9/5027 |
| 2021/0092072 | A1 * | 3/2021 | Sundaram | H04L 47/72 |
| 2021/0182108 | A1 * | 6/2021 | Eberlein | G06F 11/301 |
| 2021/0200775 | A1 * | 7/2021 | Coutinho | G06F 11/3089 |
| 2022/0360542 | A1 * | 11/2022 | Colena | H04L 47/762 |

FOREIGN PATENT DOCUMENTS

| | | |
|---|---|---|
| CN | 112256423 A | 1/2021 |
| CN | 112771502 A | 5/2021 |
| WO | 2023/103681 A1 | 6/2023 |

OTHER PUBLICATIONS

Temple, Joe. "Fit for Purpose", presented at Share Orlando 2011. Retrieved from share.confex.com/share/117/webprogram/Handout/Session9772/SHAREOrlando%20Session%209772%20JT%20F4P_FINAL.pdf. on Oct. 30, 2025 (Year: 2011).*

"Patent Cooperation Treaty PCT Notification of Transmittal of the International Search Report and the Written Opinion of the International Searching Authority, or the Declaration", Applicant's file reference PF221028PCT, International application No. PCT/CN2022/130569, International filing date Nov. 8, 2022, Date of mailing Jan. 11, 2023, 10 pages.

"Admin-set-resource-quota-dynamically—OpenStack", Feb. 17, 2021, 3 pages, <https://wiki.openstack.org/wiki/Admin-set-resource-quota-dynamically>.

"Apache Mesos Roles", The Apache Software Foundation, accessed on Aug. 12, 2021, 4 pages, 4 pages, <https://mesos.apache.org/documentation/latest/roles/>.

"Configure Memory and CPU Quotas for a Namespace", Kubernetes, Last modified Jul. 29, 2020, 5 pages, <https://kubernetes.io/docs/tasks/administer-cluster/manage-resources/quota-memory-cpu-namespace/>.

"Scheduling Policies", Kubernetes, Last modified Jul. 8, 2021, 3 pages, <https://kubernetes.io/docs/reference/scheduling/policies/>.

"Spectrum Conductor Scheduling", IBM, accessed on Aug. 13, 2021, 7 pages, <https://www.ibm.com/support/knowledgecenter/SSZU2E_2.5.0/manage_resources/resource_plan_default.html>.

"Using Capacity based Quota", Using Capacity Service, Oracle, Feb. 17, 2021, 14 pages, <https://docs.oracle.com/en/cloud/saas/field-service/20b/faccu/using-capacity-based-quota.html#/t_view_quota_matrix>.

Hamzeh et al., "A New Approach to Calculate Resource Limits with Fairness in Kubernetes", Conference Paper—Sep. 2019, ResearchGate, 9 pages, <https://www.researchgate.net/publication/335753544>.

Mell et al., "The NIST Definition of Cloud Computing", National Institute of Standards and Technology U.S. Department of Commerce, Special Publication 800-145, Sep. 2011, 7 pages.

Niemiec, Joseph, "YARN—The Capacity Scheduler", Cloudera Blog, Dec. 21, 2017, 25 pages, <https://blog.cloudera.com/yarn-capacity-scheduler/>.

Tang et al., "Dynamic forecast scheduling algorithm for virtual machine placement in cloud computing environment", The Journal of Supercomputing—Dec. 2014, Research Gate, 19 pages.

* cited by examiner

Figure 4A:
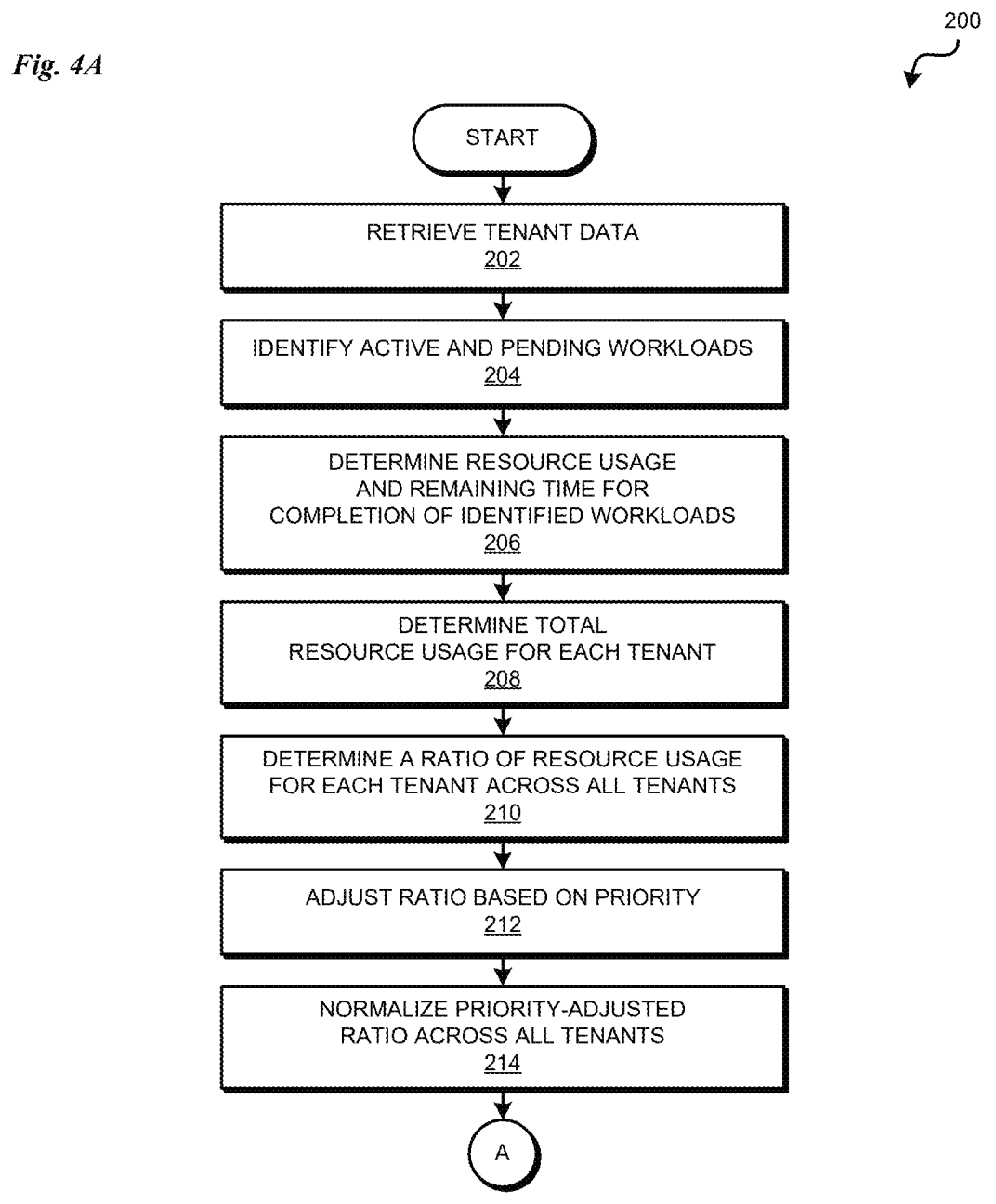

```
                    ┌──────────────┐
                    │    START     │
                    └──────────────┘
                            │
                            ▼
          ┌─────────────────────────────────────┐
          │        RETRIEVE TENANT DATA          │
          │                 202                  │
          └─────────────────────────────────────┘
                            │
                            ▼
          ┌─────────────────────────────────────┐
          │  IDENTIFY ACTIVE AND PENDING WORKLOADS │
          │                 204                  │
          └─────────────────────────────────────┘
                            │
                            ▼
          ┌─────────────────────────────────────┐
          │        DETERMINE RESOURCE USAGE      │
          │        AND REMAINING TIME FOR        │
          │   COMPLETION OF IDENTIFIED WORKLOADS │
          │                 206                  │
          └─────────────────────────────────────┘
                            │
                            ▼
          ┌─────────────────────────────────────┐
          │          DETERMINE TOTAL            │
          │   RESOURCE USAGE FOR EACH TENANT     │
          │                 208                  │
          └─────────────────────────────────────┘
                            │
                            ▼
          ┌─────────────────────────────────────┐
          │   DETERMINE A RATIO OF RESOURCE USAGE │
          │  FOR EACH TENANT ACROSS ALL TENANTS  │
          │                 210                  │
          └─────────────────────────────────────┘
                            │
                            ▼
          ┌─────────────────────────────────────┐
          │     ADJUST RATIO BASED ON PRIORITY   │
          │                 212                  │
          └─────────────────────────────────────┘
                            │
                            ▼
          ┌─────────────────────────────────────┐
          │      NORMALIZE PRIORITY-ADJUSTED     │
          │      RATIO ACROSS ALL TENANTS        │
          │                 214                  │
          └─────────────────────────────────────┘
                            │
                            ▼
                         (  A  )
```

AUTOMATIC RESOURCE QUOTA CALCULATIONS BASED ON TENANT WORKLOADS

BACKGROUND OF THE INVENTION

The present invention relates generally to the field of shared computing platforms, and more particularly to calculating resource usage quotas for tenants.

Information technology (IT) resources, such as computer processors and networks, are being called upon to support ever greater processing demands, leading to the need for server footprints of increasing size to accommodate these expanding workloads. Virtualization provides a way to abstract the components of today's IT resources to consolidate, integrate, and simplify the required infrastructure and reduce the overall cost of IT resource ownership.

Server virtualization technology allows for the configuration and deployment of multiple logical server configurations on a common physical footprint to provide processing and usage benefits beyond those of the physical configuration. The physical server's resources are abstracted to accommodate the concurrent deployment of multiple instances of virtual processors. Each virtual instance, called a virtual machine (VM), is capable of operating a separate operating system (OS) instance and its associated software stacks as if each instance was deployed on a separate physical server. This virtual view offers the benefit of not being restricted by the implementation or configuration of the underlying physical server resources. Each virtual processor instance provides a subset or superset of the various physical server resources that may be dedicated or concurrently shared by multiple VM abstractions. By using processor virtualization technologies, the system's processors can be transparently multi-programmed and multi-processed by a virtualization hypervisor to optimize processor sharing by multiple VM instances, thereby increasing processor utilization.

SUMMARY

Embodiments of the present invention provide a method, system, and program product to calculate resource quotas in a shared computing environment are provided. A processor retrieves workload data regarding a plurality of workloads in a shared computing environment, where the plurality of workloads are executing or pending execution within the shared computing environment. A processor identifies a plurality of tenants of the shared computing environment associated with the plurality of workloads. A processor determines an expected resource usage for the plurality of tenants. A processor determines a ratio of resource usage for the plurality of tenants. A processor determines a resource limit for the plurality of tenants. A processor adjusts at least one aspect of the shared computing environment based on a determination that a total expected resource usage for both executing and pending workloads of a tenant exceeds a resource limit associated with the tenant.

BRIEF DESCRIPTION OF THE SEVERAL VIEWS OF THE DRAWINGS

FIGS. 4A and 4B illustrate operational processes of a scheduler within a cloud environment, in accordance with an embodiment of the present invention.

DETAILED DESCRIPTION

Figure 1:
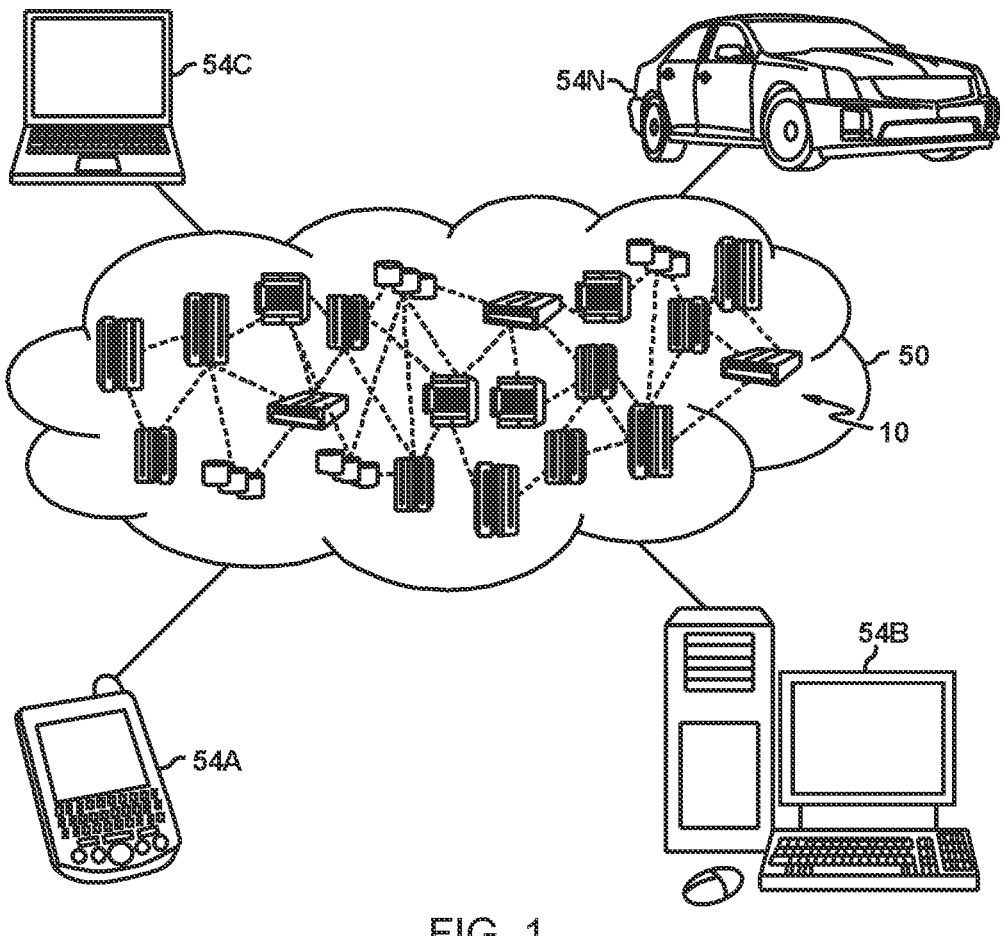
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
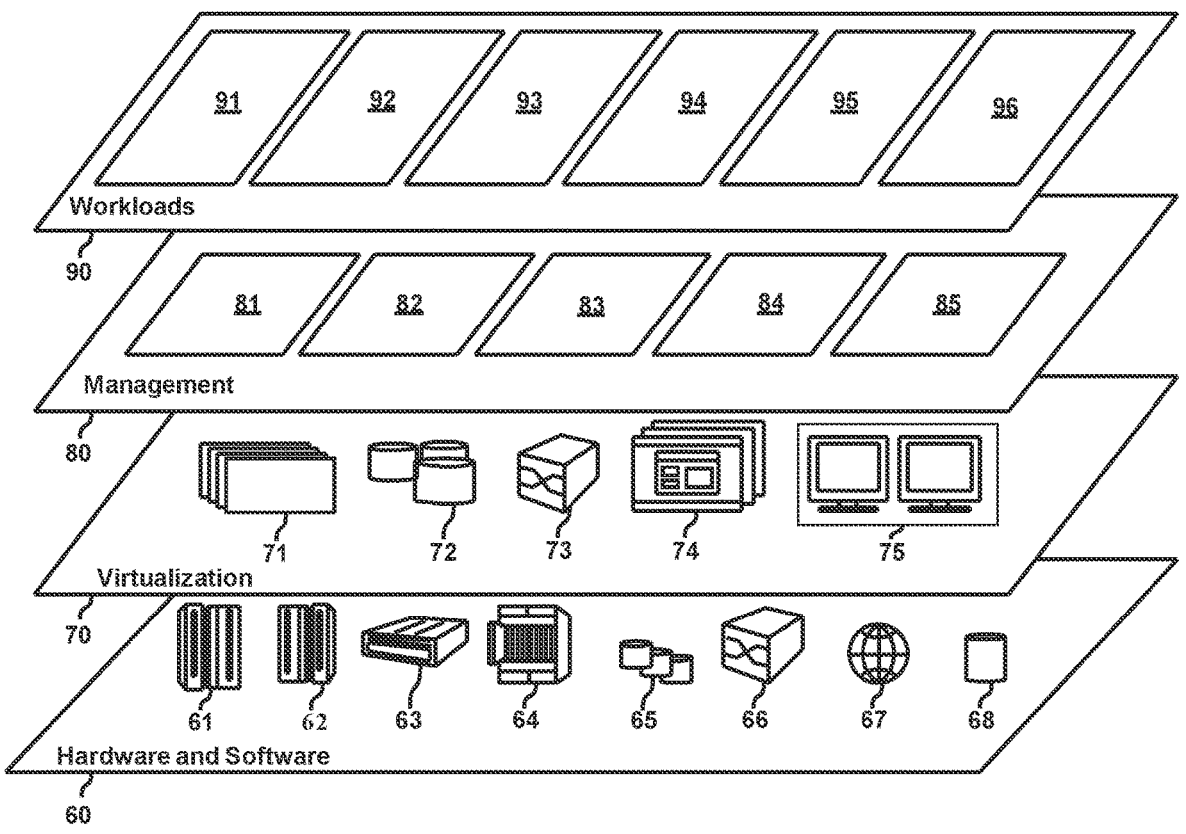
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Metering and Pricing 81 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 82 provides access to the cloud computing environment for consumers and system administrators. Service level management 83 provides cloud computing resource allocation and management such that required service levels are met. Service Level Agreement (SLA) planning and fulfillment 84 provide pre-arrangement for, and procurement of, cloud computing resources for which a future requirement is anticipated in accordance with an SLA. Resource provisioning 85 provides dynamic procurement of computing resources and other resources that are utilized to perform tasks within the cloud computing environment.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
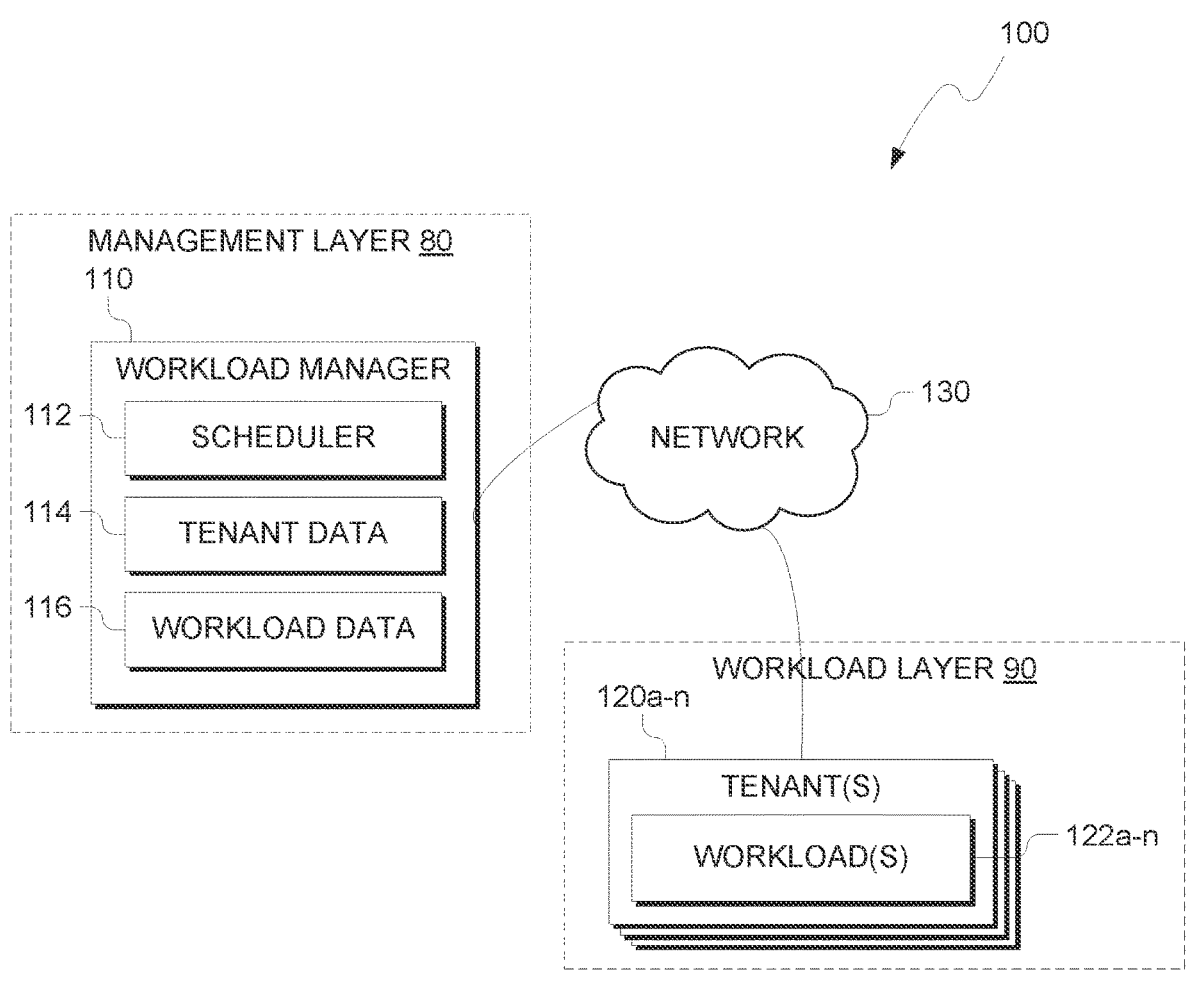
FIG. 3 illustrates a cloud environment for adjusting resource quotas of tenant workloads, in accordance with an embodiment of the present invention.

FIG. 3 is a functional block diagram illustrating cloud environment, generally designated 100, in accordance with one embodiment of the present invention. Cloud environment 100 includes workload manager 110 and workload 122a-n of tenants 120a-n connected over network 130. Workload manager 110 is executed in management layer 80 of cloud computing environment 50 and includes scheduler 112, tenant data 114 and workload data 116. Tenants 120a-n each have respective workloads 122a-n executing in workload layer of cloud computing environment 50.

In various embodiments of the present invention, workload manager 110 is any computing device that can be a standalone device, a server, a laptop computer, a tablet computer, a netbook computer, a personal computer (PC), or a desktop computer. In another embodiment, workload manager 110 represents a computing system utilizing clustered computers and components to act as a single pool of seamless resources, such as cloud computing environment 50. In general, workload manager 110 can be any computing device or a combination of devices with access to tenant data 114 and workload data 116 and is capable of executing scheduler 112. Workload manager 110 may include internal and external hardware components, as depicted and described in further detail with respect to FIG. 5.

In this exemplary embodiment, scheduler 112, tenant data 114 and workload data 116 are stored on workload manager 110. However, in other embodiments, scheduler 112, tenant data 114 and workload data 116 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between workload manager 110 management layer 80 and workloads layer 90, in accordance with a desired embodiment of the present invention.

In various embodiments, cloud computing environment 50 is utilized by various tenants 120a-n. A tenant is any person, group of people, or any type of organization that has entered into a Service Level Agreement (SLA) with a provider of cloud computing environment 50 to provision and execute various workloads 122a-n within workload layer 90. The SLA outlines various aspects regarding a tenant's ability to initiate a workload within cloud computing environment 50. One aspect that many SLAs include is a limit to the amount of resources a tenant can utilize at a given time or over a period of time. These limits define various resource quotas or allotments to resources that tenants can access. Some resource quotas dictate limit to a rate that a tenant may access a resource, such as a limit to the number of calls to an Application Programming Interface (API) provided within cloud computing environment 50. Other resource quotas dictate the amount of resources that can be allocated at a given time or over a period of time. For example, when provisioning a virtual machine in a PaaS a certain number of resources must be allocated to provide the services. Such resource rates may limit the number of workloads 122a-n that a tenant can have executing concurrently or over a given period of time.

In various embodiments, workload manager 110 is a part of management layer 80 as discussed regarding FIG. 2. Workload manager 110 monitors the resource usage of workloads 122a-n instantiated by respective tenants 120a-n. Each tenant has a record of the various resource quotas outline by the SLA in tenant data 114. During monitoring of the workload layer 90, workload manager 110 records any provisioning of resources or other resource consuming activities in workload data 116. As discussed herein, scheduler 112 compares tenant data 114, which indicates the resource quotas of each tenant, to workload data 116, which indicates the resource usage of each tenant, in order to scale, proportionally, the resource usage of each tenant.

While resource quotas are known within the shared computing domain, prior solutions have static quotas that require manual effort to change and accommodate the workloads of tenants 120a-n. Embodiments of the present invention provides an automatic method to calculate and adjust resource quotas based on the overall workload resource usage across all tenants to ensure the optimal usage of all resources utilized by cloud computing environment 50 regarding the provisioning and execution of workloads 122a-n.

In various embodiments, tenant data 114 includes a respective priority rating for each tenant. If a single entity or organization has multiple tenant arrangements, then tenant data 114 includes entries for each agreement with the respective priority of each agreement. The priority rating is a value that indicates a relative priority of any workloads provision by the respective tenants. For example, one tenant is assigned a priority of 2 while another tenant is assigned a lower priority of 0.5. In various embodiments, the scale or rating system used for priority rating can vary in a multitude of values and assignments without deviating from the invention, as scheduler 112 normalizes these values across all tenants. In some scenarios, priority rating of tenants is derived from the SLA between the operator of cloud computing environment 50 and each tenant 120a-n. In other scenarios, scheduler 112 may alter or adjust the priority rating for a tenant based on changes in resource availability within cloud computing environment 50.

In various embodiments, workload data 116 includes information regarding any currently executing workloads 122a-n that have been provisioned within cloud computing environment 50 by each of tenants 120a-n. Additionally, in scenarios where workloads 122a-n can be scheduled, workload data 116 includes information regarding any pending or scheduled workloads 122a-n that will be provisioned within cloud computing environment 50 by a tenant. In some scenarios and determinations, workload data 116 also maintains information regarding any past work, such as a tenant identifier, completion times, and resources utilized.

In various embodiments, workload data 116 also includes a workload profile indication for each current or pending workload in workload data 116. Workload profiles indicate the type of workload that is, or will be, provisioned by the tenant. Workload profiles provide a framework to define expected resource consumption based on the type of workload to be provisioned, and the corresponding amount of resources needed to provision for workloads of each type. Example workload profiles include, but are not limited to, batch profile, streaming profile, interactive profile, and server profile. Each profile indicates the resource usage patterns that are typical with regard to the identified profile. For example, a batch profile indicates a workload that is a single instance that begins and ends without repeating, such as a workload that evokes a machine-learning model for a classification of a data set. A streaming profile indicates a workload that continuously consume resources at regular intervals, such as delivering a media file to a user. An interactive profile indicates a workload that dynamically changes in resource consumption when running, such as a virtualized desktop. A web server profile indicates a workload that is a long-running workload with an expected level of operation yet no expected termination, such as a virtualized web server that will operate constantly over an unknown period of time. One of ordinary skill in the art will appreciate that many different types of workload profiles may be defined by workload data 116 without deviating from the invention.

In some embodiments, tenants 120a-n define or select a workload profile when provisioning workloads 122a-n. In other embodiments, scheduler 112 monitors resource provisioning for executed workloads and assigns a profile based on the type, amount and frequency of resource usage incurred by the monitored workload. For each profile type, scheduler 112 generates a classification model for the amount, frequency and type of resource usage. Based on an observed resource consumption of each workload, scheduler 112 tunes the classification model in an unsupervised training period to develop a pattern recognition model that classifies various workload parameters (e.g., the amount of resources usage, the frequency of resources usage and the type of resources utilized). In some scenarios, scheduler 112 generates a training set from tenant provided workload profile designations. In other scenarios, the training set utilized by scheduler 112 is derived based on user-supervised classification of known workload patterns.

In various embodiments, scheduler 112 determines an expected resource consumption for each workload, current or pending, across all tenants 120*a-n*. Based on the determined or user-provided workload profile, scheduler 112 determines an expected resource consumption that indicates the number of resources to be consumed over an expected runtime of the workload. In addition to the resource usage of the workload, workload data 116 also includes expected completion times for each workload. In some scenarios, a tenant includes in the request to initiate a workload a completion time. In other scenarios, based on the workload profile, scheduler 112 determines the expected completion time. For example, in batch workloads, scheduler 112 retrieves previous workload data 116 recorded from previous workload from the tenant or from similar workload types, then determines average runtimes for the prior similar workloads.

In some embodiments, scheduler 112 determines an expected resource consumption for each workload based on the tenant and workload profile by determining an average time progress for a resource consumption unit. Based on an average completion time of similar workloads and an average resource consumption of similar workloads, scheduler 112 determines an average time progress for a resource consumption unit by dividing the average completion time by the average number of consumed resource units for workloads of certain types. Scheduler 112 utilizes the average resource consumption unit for certain workload types to project resource consumption of any similar type of workload, based on the expected completion time of the workload. Scheduler 112 uses the average time progress for a resource consumption unit to determine remaining resource usage for current workloads that need to prorate resource usage for the remaining time of completion for the workload.

In some embodiments and scenarios, scheduler 112 generates a machine learning model based on training of previously completed workload data 116. For example, scheduler 112 generates a decision tree with various paths that change based on the specific indicators of a workload, such as profile type, tenant identifier, and the like. For each workload being evaluated, scheduler 112 compares or applies the indicators of each workload to the decision tree to determine and the expected resource consumption unit, adjusting the expected resource consumption based on the expected completion time for the workload. In some embodiments, for each workload being evaluated, scheduler 112 applies the indicators of each workload and the expected completion time of each workload to the machine learning model to determine the expected resource consumption for the expected completion time for the workload.

In various embodiments, after determining the resource consumption for all current and pending workloads on a per tenant basis, scheduler 112 normalizes the total resources to be consumed across all tenants to determine a resource consumption ratio for each tenant. For example, a resource consumption for all workloads of tenant A is 200 and a resources consumption for all workloads of tenant B is 50. The normalized value summates both values for a total of 250, then determines the proportion each tenant has regarding the total (e.g., the normalized value for tenant A is 200/250 or 0.8 and the normalized value for tenant B is 50/250 or 0.2).

In various embodiments, scheduler 112 adjusts the resource consumption ratio for each tenant based on the assigned priority of the tenant. For example, if a tenant A has a normalized resource consumption ratio of 0.4 across all tenants and a priority of 0.1, then the priority-adjusted resource consumption ratio is 0.04. In various embodiments, scheduler 112 normalizes the priority-adjusted resource consumption ratio across all tenants with current or pending workloads such that the total of all priority-adjusted resource consumption ratio across the tenants is equal to one.

Based on the normalized priority-adjusted resource consumption ratio across all tenants, scheduler 112 determines a new resource quota for each tenant. By considering the normalized priority-adjusted resource consumption ratios for each tenant with the resources that are available for allocation in cloud computing environment 50 that can be utilized and shared in entirety across the tenants with current and pending workloads, scheduler 112 determines a new resource quota for each tenant. As such, scheduler 112 can automatically adjust the proportion or ratio of the overall resources offered by cloud computing environment 50, while also accounting for the types of workloads as well as priority derived from SLA's between the operator of cloud computing environment 50 and tenants 120*a-n*.

In various embodiments, based on a current overall resource usage of a tenant and the newly determined priority-adjusted resource consumption ratio, scheduler 112 adjusts the available resources to be provisioned to the tenant at any given time. Based on the overall utilization of the workloads from tenants, scheduler 112 ensures that the ratio of deployed resources match the proportion of the priority-adjusted resource consumption ratios for each tenant. If a tenant either attempts to, via scheduling a workload, or otherwise exceeds the resource quota, then scheduler 112 will reduce the current or future resource consumption for the tenant. For example, if another tenant with a higher priority-adjusted resource consumption ratio is observed, then scheduler 112 may limit another tenant's ability to have more workloads scheduled and executed at a given time across all tenants. In some scenarios, scheduler 112 has access to an electronic version of the SLA agreement between the operator of cloud computing environment 50 and tenants 120*a-n*. Based on the agreed terms, if a user with a lower priority-adjusted resource consumption ratio and resulting resource quota plans to exceed the quotas with some pending workloads, scheduler 112 may adjust the priority of the tenant in exchange for raising the SLA resource usage tier, instructing metering and pricing 81 of the management layer 80 to record the increased rate.

Figure 4B:
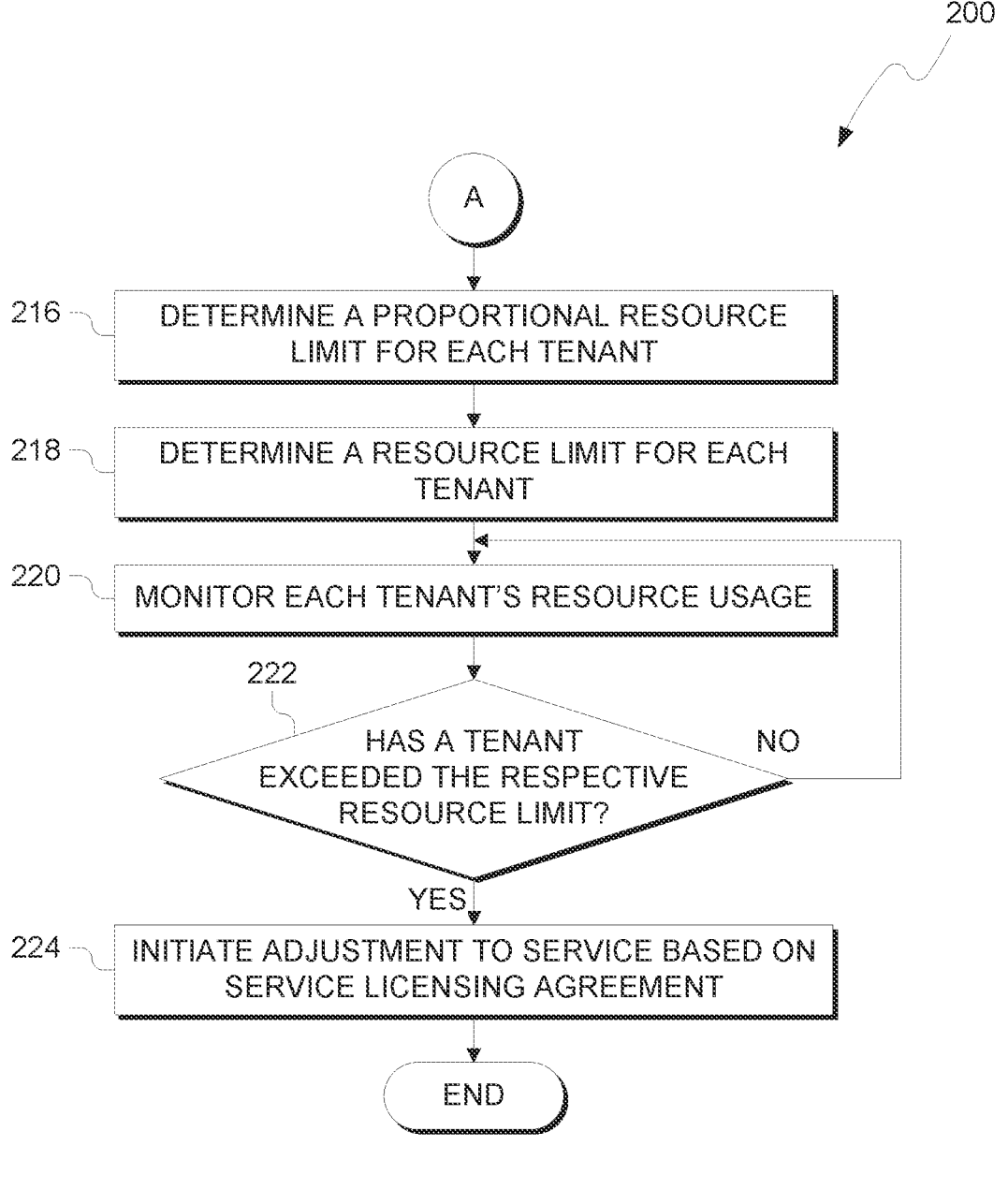

FIGS. 4A and 4B illustrates operational processes, generally designated 200, of scheduler 112 in management layer 80 of cloud computing environment 50. In various embodiments, scheduler 112 continuously performs the processes 202-224, constantly adjusting resource quotas for tenants 120*a-n*, as discussed herein. In some scenarios, scheduler 112 performs processes 202-224 in response to one or more changing conditions within cloud computing environment 50, including, but not limited to, submission or completion of a workload, a change in required completion time or resource requirements of pending or current workloads, when a workload releases a resource from use, changes in priorities assigned to tenants, updates to the machine learning model due to a re-training of the model, requested or pending workloads exceeding a threshold, or performance metrics of the cloud computing environment 50 reach a certain threshold value.

In process 202, scheduler 112 retrieves tenant data 114. Tenant data 114 includes identifiers for all tenants that utilize cloud computing environment 50 as well as an assigned priority rating. In process 204, scheduler 112 identifies any active or pending workloads for each tenant. Active workloads are workloads that have been started and are currently executing in workloads layer 90 of cloud computing environment 50. Pending workloads are workloads that a tenant has provided for execution and are not yet executing, or scheduled to execute, at some predetermined time in the future, in workloads layer 90 of cloud computing environment 50.

For both active and pending workloads, scheduler 112 determines a resource usage of each tenant for both active and pending workloads (process 208). Based on a workload profile, either assigned by a tenant or determined by scheduler 112. For example, via a classification machine-learning model, scheduler 112 determines a resource usage rate for each workload (process 206). Each profile indicates an expected amount of resources the workload will utilize per a given unit of time (e.g., amount of resources used per minute). Additionally, scheduler 112 determines a remaining time for completion (process 206). Based on workload profiles, scheduler 112 identifies an expected completion time for each type of workload. For pending workloads, scheduler 112 uses the total expected completion time indicated in the workload profile of workload data 116. For active workloads, scheduler 112 identifies the start time of the workload and subtracts the current runtime of the workload from the total expected completion time to determine an expected remaining completion time for the workload. In process 208, based on the remaining time of active workloads and the total time of pending workloads for a given tenant, scheduler 112 determines the total resource usage for each tenant for the expected compute time of all active and pending workloads.

In process 210, scheduler 112 determines a resource consumption ratio for each tenant. The resource consumption ratio is a normalized set of resource consumption values across all tenant, which indicates the overall percentage each tenant is utilizing resources of cloud computing environment 50. For example, using only two tenants, if resource usage is measured in allocated memory and Tenant A has 15 GB of allocated memory for workloads both active and pending and Tenant B has 5 GB of allocated memory for workloads both active and pending, then the consumption ratio is 0.75 for Tenant A (15/(15+5)) and 0.25 for Tenant B (5/(15+5)). In process 212, scheduler 112 adjusts the resource consumption ratios based on the assigned priority ratings retrieved in process 202. Returning to the example, the priority rating for Tenant A may be 0.2 and for Tenant B, 0.8. In result, the priority-adjusted resource consumption ratio for Tenant A would be 0.15 (0.2*0.75) and for Tenant B 0.2 (0.8*0.25). In process 214, scheduler 112 normalizes each of the priority-adjusted resource consumption ratios from process 212. Returning to the example, the normalized priority-adjusted resource consumption ratios for Tenant A would be 0.43 (0.15/(0.15+0.2)) and for Tenant B 0.57 (0.2/(0.15+0.2)). In process 216, scheduler 112 determines a proportional resources limit for each tenant, based on the normalized priority-adjusted resource consumption ratios for each tenant. In process 218, based on the proportional resources limit for each tenant and the available resources in cloud computing environment 50, scheduler 112 determines resources limit for each tenant that can be used by any pending or active workloads 120a-n within cloud computing environment 50.

In process 220, scheduler 112 monitors each tenant's resources usage of active workloads within cloud computing environment 50. If the tenant does not exceed the respective resource limit (NO branch of decision process 222), then scheduler 112 continues monitoring resource usage of the tenant. If the tenant exceeds the resource limit (YES branch of decision process 222), then scheduler 112 initiates the adjustment of the service provided by cloud computing environment 50 to accommodate the exceeded resource usage. In some scenarios, scheduler 112 may restrict loading of pending workloads until the resource usage of the tenant returns to a level below the quota. In other scenarios, where an SLA permits changing of resource usage tiers, scheduler 112 may instruct metering and pricing 81 of the management layer 80 to record the increase a metered rate for the tenant. In additional scenarios, scheduler 112 prohibits any additional workloads from being executed if the additional workload would cause the tenant to exceed the adjusted quota.

In some embodiments, scheduler 112 takes into account prior resource quotas for each tenant that were calculated or otherwise available from a previous iteration processes 200. Based on the proportional share of tenants across the prior resource quotas, scheduler 112 determines resource quotas ratios for each tenant. Based on the prior proportions shared among the tenants (e.g., Tenant A previously proportionally shared 60% of resources and Tenant B 40%), scheduler 112 can adjust and project the tenants prior resource quotas ratios based on priority, and scale the ratios based on the available resources of cloud computing environment 50. In some embodiments, scheduler 112 determines, concurrently, how many resources are required for each workload (active or pending) to meet its specified completion time. Additionally, scheduler 112 determines, concurrently, a proportion of any of the above values across tenants, a product of proportions, a result proportion, or a resource quota for each tenant.

Figure 5:
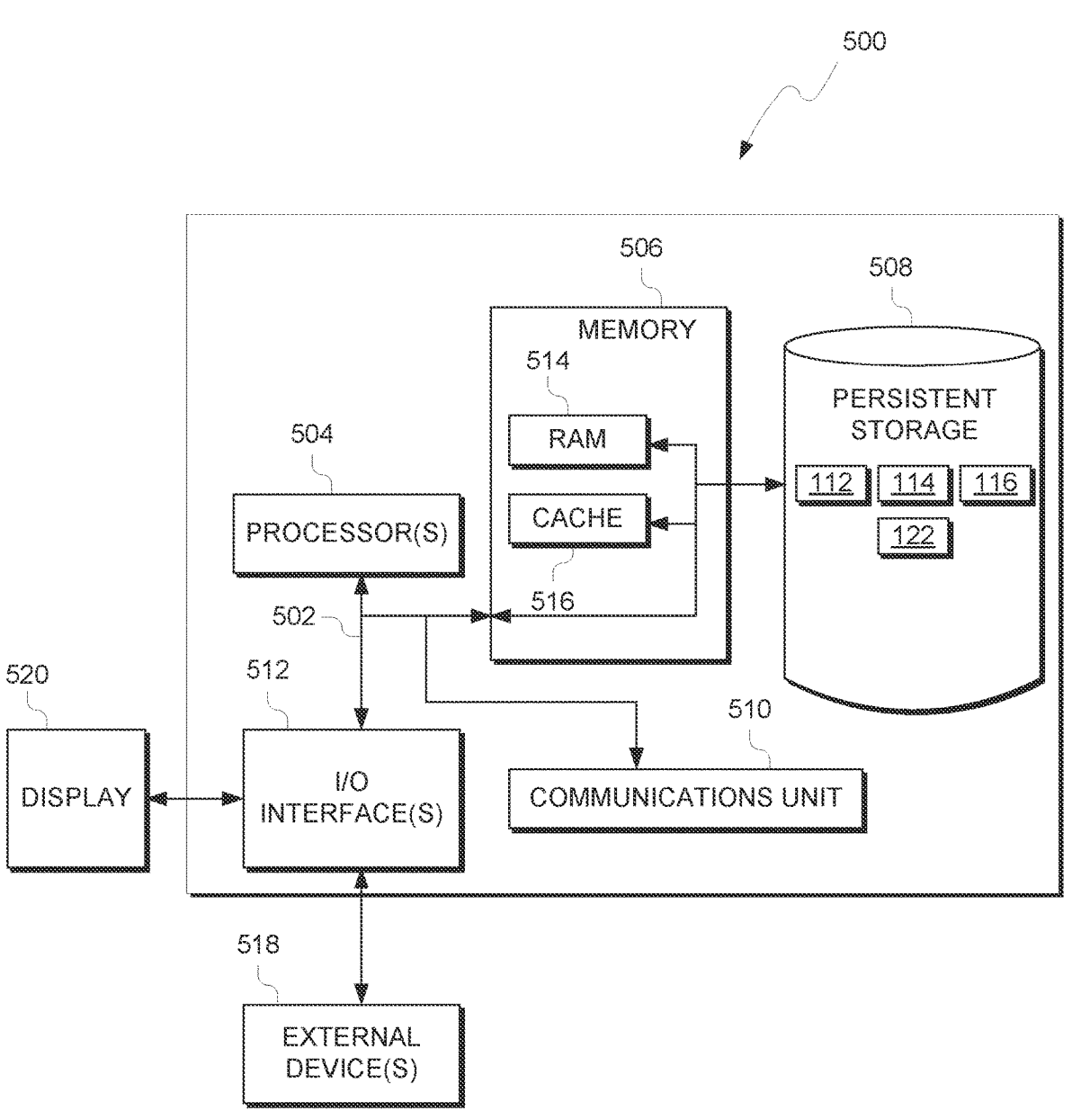
FIG. 5 depicts a block diagram of components of the computing device executing a personal data maintainer workload, in accordance with an exemplary embodiment of the present invention.

FIG. 5 depicts a block diagram of components of a computing device 500, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Scheduler 112, tenant data 114 and workload data 116 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. Scheduler 112, tenant data 114 and workload data 116 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., scheduler 112, tenant data 114 and workload data 116, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:

automatic optimization of resource allocation in a multi-tenant shared computing environment such that a normalized priority-adjusted resource consumption by a plurality of executing and pending workloads corresponding to a plurality of tenants maximizes a utilization of available resources in the shared computing environment, the automatic optimization comprising:

retrieving workload data regarding the plurality of workloads in the shared computing environment;

tuning, by a scheduler executing in the shared computing environment and using a training set, a classification model to classify a workload parameter based on an amount of computing resource usage, a frequency of the computing resource usage, a number of calls to an interface, and a type of the computing resource usage, the tuning forming a tuned pattern recognition model, wherein the training set is generated from a set of workload profiles and known workload patterns;

outputting from the scheduler by inputting the workload data into the tuned pattern recognition model an expected resource usage for the plurality of tenants;

determining a normalized priority-adjusted ratio of resource usage for each of the plurality of tenants by computing for each tenant in the plurality a product of a normalized resource consumption ratio and a priority of the each tenant;

determining a resource limit for the plurality of tenants; and adjusting at least one aspect of the shared computing environment based on a determination that a total expected resource usage for both executing and pending workloads of a tenant exceeds a resource limit associated with the tenant.

2. The method of claim 1, wherein the expected resource usage is determined based, at least in part, on a respective workload profile associated with the plurality of workloads.

3. The method of claim 1, wherein a workload profile of a particular workload is determined based, at least in part, on a machine-learning model.

4. The method of claim 3, wherein the machine-learning model is generated based on training of previously executed workloads.

5. The method of claim 1, wherein the resource limit for the plurality of tenants is adjusted in response to one or more of the following:

submission or completion of a workload, a change in required completion time of pending or current workloads, when a workload releases a resource from use, or updates to the classification model due to a re-training of the classification model.

6. The method of claim 1, the method further comprising:

determining a remaining time for completion for the plurality of workloads; and determining a total resource usage for the plurality of tenants.

7. A computer program product comprising:

one or more computer-readable storage media and program instructions stored on the one or more computer-readable storage media, the program instructions when executed by a processor causing operations, the operations comprising:

automatic optimization of resource allocation in a multi-tenant shared computing environment such that a normalized priority-adjusted resource consumption by a plurality of executing and pending workloads corresponding to a plurality of tenants maximizes a utilization of available resources in the shared computing environment, the automatic optimization comprising:

retrieving workload data regarding the plurality of workloads in the shared computing environment;

tuning, by a scheduler executing in the shared computing environment and using a training set, a classification model to classify a workload parameter based on an amount of computing resource usage, a frequency of the computing resource usage, a number of calls to an interface, and a type of the computing resource usage, the tuning forming a tuned pattern recognition model, wherein the training set is generated from a set of workload profiles and known workload patterns;

outputting from the scheduler by inputting the workload data into the tuned pattern recognition model an expected resource usage for the plurality of tenants;

determining a normalized priority-adjusted ratio of resource usage for each of the plurality of tenants by computing for each tenant in the plurality a product of a normalized resource consumption ratio and a priority of the each tenant;

determining a resource limit for the plurality of tenants; and adjusting at least one aspect of the shared computing environment based on a determination that a total expected resource usage for both executing and pending workloads of a tenant exceeds a resource limit associated with the tenant.

8. The computer program product of claim 7, wherein the expected resource usage is determined based, at least in part, on a respective workload profile associated with the plurality of workloads.

9. The computer program product of claim 7, wherein a workload profile of a particular workload is determined based, at least in part, on a machine-learning model.

10. The computer program product of claim 9, wherein the machine-learning model is generated based on training of previously executed workloads.

11. The computer program product of claim 7, wherein the resource limit for the plurality of tenants is adjusted in response to one or more of the following:

submission or completion of a workload, a change in required completion time of pending or current workloads, when a workload releases a resource from use, or updates to the classification model due to a re-training of the classification model.

12. The computer program product of claim 7, the operations further comprising:

determining a remaining time for completion for the plurality of workloads; and determining a total resource usage for the plurality of tenants.

13. A computer system comprising:

one or more computer processors;

one or more computer readable storage media; and program instructions stored on the computer readable storage media for execution by at least one of the one or more processors, the program instructions when executed by the one or more processors causing operations, the operations comprising:

automatic optimization of resource allocation in a multi-tenant shared computing environment such that a normalized priority-adjusted resource consumption by a plurality of executing and pending workloads corresponding to a plurality of tenants maximizes a utilization of available resources in the shared computing environment, the automatic optimization comprising:

retrieving workload data regarding the plurality of workloads in the shared computing environment;

tuning, by a scheduler executing in the shared computing environment and using a training set, a classification model to classify a workload parameter based on an amount of computing resource usage, a frequency of the computing resource usage, a number of calls to an interface, and a type of the computing resource usage, the tuning forming a tuned pattern recognition model, wherein the training set is generated from a set of workload profiles and known workload patterns;

outputting from the scheduler by inputting the workload data into the tuned pattern recognition model an expected resource usage for the plurality of tenants;

determining a normalized priority-adjusted ratio of resource usage for each of the plurality of tenants by computing for each tenant in the plurality a product of a normalized resource consumption ratio and a priority of the each tenant;

determining a resource limit for the plurality of tenants; and adjusting at least one aspect of the shared computing environment based on a determination that a total expected resource usage for both executing and pending workloads of a tenant exceeds a resource limit associated with the tenant.

14. The computer system of claim 13, wherein the expected resource usage is determined based, at least in part, on a respective workload profile associated with the plurality of workloads.

15. The computer system of claim 13, wherein a workload profile of a particular workload is determined based, at least in part, on a machine-learning model.

16. The computer system of claim 15, wherein the machine-learning model is generated based on training of previously executed workloads.

17. The computer system of claim 13, wherein the resource limit for the plurality of tenants is adjusted in response to one or more of the following:

submission or completion of a workload, a change in required completion time of pending or current workloads, when a workload releases a resource from use, or updates to the classification model due to a re-training of the classification model.

* * * * *